(Model.)
W. H. LEININGER.
ANIMAL EXTERMINATOR.
No. 360,232. Patented Mar. 29, 1887.
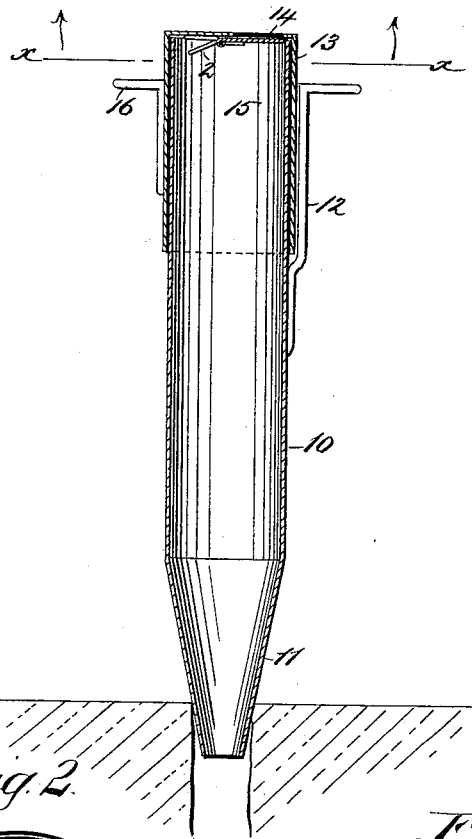
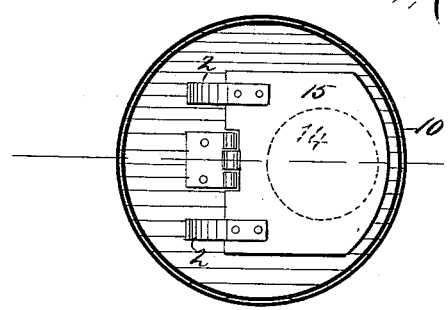
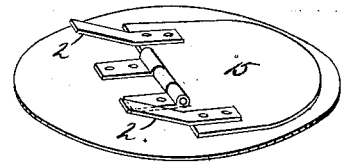
WITNESSES:
Francis McArdle.
C. Sedgwick
INVENTOR
W. H. Leininger
BY Munn &Co
ATTORNEYS.

ize 11 is then placed within the opening of the burrow of the animal and a reciprocating motion is imparted to the tube 13, the operator grasping the implement by the two handles 12 and 16. As the tube 13 is drawn up air will enter the tube through the opening 14, the downward throw of the valve being, however, limited by the ears 2. When the tube 13 is forced downward, the valve will close upon its seat, and the smoke generated within the tube 10 will be forced downward within the burrow of the animal, which will be thereby suffocated or smothered.

UNITED STATES PATENT OFFICE.

WILLIAM H. LEININGER, OF SALEM, OREGON.

ANIMAL-EXTERMINATOR.

SPECIFICATION forming part of Letters Patent No. 360,232, dated March 29, 1887.

Application filed December 22, 1886. Serial No. 222,306. (Model.)

*To all whom it may concern:*

Be it known that I, WILLIAM H. LEININGER, of Salem, in the county of Marion and State of Oregon, have invented a new and Improved Animal-Exterminator, of which the following is a full, clear, and exact description.

My invention relates to that class of appliances that are employed to force a volume of smoke within the burrows of squirrels, the American gopher, and similar animals. The invention consists, essentially, of two cylinders, one of which is arranged to fit over the other, and is provided with a valve of novel construction, as will be hereinafter more fully described, and specifically pointed out in the claims.

Reference is to be had to the accompanying drawings, forming a part of this specification, in which similar figures of reference indicate corresponding parts in all the views.

Figure 1 is a central vertical sectional view of my improved form of animal-exterminator. Fig. 2 is an enlarged sectional view taken on line *x x* of Fig. 1; and Fig. 3 is a perspective view of the under side of the cover.

In the drawings, 10 represents the inner tube, which is formed with a nozzle, 11, and provided with a handle, 12. About the upper end of this tube 10 there is fitted a tube, 13, in the top of which there is an aperture, 14, said aperture being closed by a flat valve, 15, that is hinged to the main portion of the top or cover of the tube and provided with outwardly-extending ears 2, that extend downward at an angle from the valve. The tube 13 is provided with a handle, 16.

In operation the tube 10 is filled with straw or other combustible material. This material is ignited and the tube 13 placed in the position in which it is shown in Fig. 1. The noz-

Having thus fully described my invention, I claim as new and desire to secure by Letters Patent—

1. An animal-exterminator comprising a tube having a nozzle at its lower end and a handle, a second tube sliding upon the first-named tube and having an aperture in its upper end, an inward-opening valve for closing said aperture, and a handle, substantially as set forth.

2. An animal-exterminator consisting of the combination of the two telescoping tubes, each provided with a handle, a nozzle at the lower end of the lower tube, the top of the upper tube having an aperture, a valve hinged to the under side of the top adjacent to the aperture, to close the same when the upper tube is forced downward, and stops on the rear edge of the valve, adapted to strike against the top of the said upper tube and limit the opening movement of the valve, substantially as set forth.

WILLIAM H. LEININGER.

Witnesses:
E. B. WATSON,
W. T. HUME.